United States Patent Office 2,824,806
Patented Feb. 25, 1958

2,824,806

PROCESS FOR MANUFACTURING COMPRESSED CEREAL BARS

Samuel A. Matz, Chicago, Ill., assignor to the United States of America as represented by the Secretary of the Army No Drawing. Application August 27, 1953
Serial No. 377,003

2 Claims. (Cl. 99—83)

(Granted under Title 35, U. S. Code (1952), sec. 266)

The invention described herein, if patented, may be manufactured and used by or for the Government for governmental purposes, without the payment to me of any royalty thereon.

This invention relates to a process for making compressed cereal bars and its principal object is to provide a cereal bar which will withstand the normal rough handling to which such rations are subjected. Cereal bars are frequently used as part of the rations issued to troops in war zones. While they are carefully wrapped and boxed, their boxes are often dropped in handling, and unless the cereal bars have an inherent rigidity, they will fragmentize, which will result in losses if not actual discarding.

Another object is to produce a compressed cereal bar without using glycerol and other polyhydroxy type binders. Such binders sometimes produce off-flavors and are therefore undesirable. An ancillary object is to provide a cereal bar which is palatable and nutritious.

In general, my process involves adding 1 to 6% of water to sugar-coated cereals while they are being agitated for the minimum time necessary to distribute all the water over the surfaces of the cereal particles, then compressing the moistened cereal particles with a pressure of not less than 500 pounds per square inch nor more than 2000 pounds per square inch to make an easily handled bar or cake. Other ingredients may be added after the water is mixed with the cereal particles and before compression: these ingredients may be fats or shortening, solid flavoring, non-fat milk solids, and other solids in finely-divided form, but they must be of such a nature and of such proportions that they will not seriously interfere with the adhesion of the moistened particles of sugar-coated cereal. Shortening imparts a certain degree of softness to the bar and improves the eating properties, but too much shortening makes the bar too soft and fragile for normal handling. I prefer that the shortening be from 1% to 12% of the total weight of the bar and that the non-fat milk solids range from 1% to 6% of the total weight.

To give a clearer idea of my process and the products produced by it, I give below five examples, together with some tests for breaking strength, which clearly demonstrate the effectiveness of my discovery that the addition of water in small amounts will cause firm adhesion of sugar-coated cereal particles following compression into flat bar form.

EXAMPLE I

Sugar-coated oven-puffed rice of the variety sold on the market as "Krinkles" was placed in the bowl of a Hobart mixer employing a flat paddle and the machine was started. With the paddle actively mixing the particles, water was added slowly until the quantities shown in Table 1 below had been added. After the second mix, uncoated oven-puffed rice was substituted for part of the sugar-coated, oven-puffed rice, as the table makes clear. One-ounce bars were prepared by compression of one ounce of each "run" in a Denison apparatus, applying six tons pressure on an area of 3¼ x 1¹⁵⁄₁₆ in., using two strokes. Then the bars were tested for breaking strength in the specially devised breaking point tester described below.

Table 1

| Sample No. | Sugar-coated oven-puffed rice (gm.) | Uncoated oven-puffed rice (gm.) | H₂O (gm.) | Average Breaking Wt. (gm.) |
|---|---|---|---|---|
| 1 | 147 | 0 | 0 | 0 |
| 2 | 144 | 0 | 3 | 950 |
| 3 | 117 | 30 | 3 | 350 |
| 4 | 87 | 60 | 3 | 225 |
| 5 | 57 | 90 | 3 | 100 |
| 6 | 0 | 147 | 3 | 0 |

It should be explained that samples 3 and 4 were only half as thick as the other bars, hence their breaking strength was much lower than that of sample 2.

The type of mixer used is not critical, but the speed and design of the paddle should be such as to minimize breakage of the cereal particles. A drum type mixer or a ribbon mixer, such as are manufactured by the Day Company, would produce equally good results. The Denison apparatus referred to above is a hydraulic press. Any apparatus capable of applying sufficient pressure to a die can be used for forming the cereal bars. In forming a bar, the more strokes that are used, the firmer the bar will be up to a limiting number of strokes, which varies with different types of cereals.

THE BREAKING POINT TESTER

The breaking point tester used was a very simple device which forms no part of the present invention, hence is not illustrated. It included a flat base adapted to lie on a table, a raised cereal bar clamp fixed to the flat base and adapted to clamp the cereal bar at one end only so that the cereal bar extended horizontally over the base with one end free to sustain loads, a plunger pivoted or hinged to the base and adapted to contact the free end of the cereal bar on its upper face, and a weight pan fixed on top of the plunger for receiving one of a set of scale weights, starting with 100 gm. and increasing by 100 gm. increments. The weights were added to the pan at regular intervals until the cereal bar broke. This weight was recorded as an indication of bar rigidity and resistance to breakage. Since the weight of the plunger and the scale pan are constant, their weight was not recorded as part of the breaking weight.

EXAMPLE II

Sugar-coated oven-puffed rice ("Krinkles") was placed in the bowl of the same Hobart mixer and the mixer started. With the particles in constant agitation, water was added slowly until 4 gm. had been added to 160 gm. of the cereal. Then 20 gm. of non-fat milk solids was added slowly while mixing continued. Finally, melted shortening (20 gm.) was slowly added and mixing was continued until the shortening was fully mixed. This mixture was compressed into a cereal bar by putting one ounce in the Denison apparatus and applying eight tons of pressure on an area of 3¼ x 1¹⁵⁄₁₆ in., using two strokes. Then the bar was tested in the tester described above. See sample 1 of the following table.

To show the effect of the sugar coating of the cereal particles on the strength of the cereal bar, I also added 40 gm. of "Drivert" (approximately 90% sucrose and 10% invert sugar) to 120 gm. of non-sugar-coated oven-puffed rice, to make a total of 160 gm., the same weight used in making sample 1. Thus, the same amount of sugar was present in both samples. Then 4 gm. of water and the non-fat milk solids and shortening were added exactly as described above. A one-ounce bar was made of this second run, and tested in the tester described above. Table 2 shows the results:

Table 2

| Sample No. | Sugar-coated cereal (gm.) | Sugar-free cereal (gm.) | "Drivert" (gm.) | Non-fat milk solids (gm.) | Short-ening (gm.) | H₂O (gm.) | Av. Breaking Wt. (gm.) |
|---|---|---|---|---|---|---|---|
| 1 | 160 | 0 | 0 | 20 | 20 | 4 | 150 |
| 2 | 0 | 120 | 40 | 20 | 20 | 4 | 50 |

It is clear from the results tabulated above that the addition of "Drivert" to the moistened sugar-free oven-puffed rice was much less effective in causing adherence of the particles to each other than the moistened sugar coating on commercially available sugar-coated oven-puffed rice.

EXAMPLE III 160 gm. of sugar-coated puffed wheat, of the variety sold under the trademark "Sugar Crisp," was placed in the bowl of the Hobart mixer and water was added in proportions greater than in Examples I and II, as shown by Table 3 below. The same amounts of non-fat milk solids and shortening (20 gm. of each) were added, exactly as described in connection with Example II. Four different cereal bars of one ounce each were thus made, compressed with 7 tons pressure in the Denison apparatus (using four strokes) and then tested as previously described.

In samples 5 and 6, instead of sugar-coated puffed wheat, uncoated gun-puffed wheat was employed and enough "Drivert" was mixed in powdered form (after moistening) to produce the same relative sugar concentration as in the sugar-coated puffed wheat (samples 1-4). Samples 5 and 6 were then tested as explained above, with the results shown in Table 3:

Table 3

| Sample No. | Sugar-coated cereal (gm.) | Sugar-free cereal (gm.) | "Drivert" (gm.) | Non-fat milk solids (gm.) | Short-ening (gm.) | H₂O (gm.) | Av. Breaking Wt. (gm.) |
|---|---|---|---|---|---|---|---|
| 1 | 160 | 0 | 0 | 20 | 20 | 0 | 0 |
| 2 | 160 | 0 | 0 | 20 | 20 | 8 | 1,300 |
| 3 | 160 | 0 | 0 | 20 | 20 | 12 | 3,250 |
| 4 | 160 | 0 | 0 | 20 | 20 | 16 | 4,100 |
| 5 | 0 | 120 | 40 | 20 | 20 | 0 | 300 |
| 6 | 0 | 120 | 40 | 20 | 20 | 8 | 400 |

Here again is evidence of the high strength bond created by a relatively small amount of water added to a sugar-coated puffed cereal prior to compression into a cereal bar.

EXAMPLE IV 172 gm. of sugar-coated corn flakes of the variety sold under the trade-mark "Corn-fetti" was placed in the bowl of a Hobart mixer as before described and 8 gm. of water was added slowly while the mixing continued. Then shortening (20 gm.) was mixed in as described above. A one-ounce cereal bar was prepared from this mixture in the Denison apparatus, using six tons pressure with three strokes. In parallel experiments, summarized in Table 4, samples 2 and 3, respectively, a cereal bar was made without water, and another cereal bar was made in the identical way with the same amount of water (8 gm.) but with 57 gm. of "Drivert" added to sugar-free, that is, uncoated corn flakes. The results given below again prove the effectiveness of adding water in a relatively small amount to sugar-coated cereal flakes prior to compression.

Table 4

| Sample No. | Sugar-coated cereal (gm.) | Sugar-free cereal (gm.) | "Drivert" (gm.) | Short-ening (gm.) | H₂O | Av. Breaking Wt. (gm.) |
|---|---|---|---|---|---|---|
| 1 | 172 | 0 | 0 | 20 | 8 | 1,000 |
| 2 | 172 | 0 | 0 | 20 | 0 | 100 |
| 3 | 0 | 115 | 57 | 20 | 8 | 150 |

EXAMPLE V

Sugar-coated oven-puffed rice ("Krinkles") and sugar-coated corn flakes ("Corn-fetti") in equal amounts were put in the mixer described above and water was added slowly. The melted shortening was added slowly, then sucrose was added slowly, and finally non-fat milk solids was added, likewise slowly. The entire mass was thoroughly mixed for three minutes. A bar weighing 1½ ounces was made in the Denison apparatus applying 6⅛ tons pressure on an area of 3¼ x 1⅟₁₆ in. using one stroke; the breaking strength test explained above showed an average breaking strength of 400 gm. But a parallel experiment, using the same ingredients in the same proportions but omitting the water, resulted in a bar having a breaking strength of only 100 gm. See the following table for more details.

Table 5

| Sample No. | Rice cereal (gm.) | Corn cereal (gm.) | Short-ening (gm.) | Sucrose (gm.) | Non-fat milk solids (gm.) | H₂O (gm.) | Av. Breaking Wt. (gm.) |
|---|---|---|---|---|---|---|---|
| 1 | 150 | 150 | 50 | 35 | 70 | 10 | 400 |
| 2 | 150 | 150 | 50 | 35 | 70 | 0 | 100 |

Obviously mixtures of the cereals mentioned herein in various proportions, and mixtures of similar sugar-coated cereals, may be used to form cereal bars in accordance with the invention. Also small amounts of flavoring materials could be added, for example, small proportions of chocolate, cocoa butter, licorice and other solid flavorings.

I am aware of the Albert Musher Patents No. 2,170,155 and No. 2,278,466, neither of which discloses a process similar to the one I claim.

What I claim is:

1. A process of making cereal bars capable of withstanding rough handling which comprises slowly adding 1 to 6% by weight of water to a sugar-coated processed particulate cereal whereby the cereal particles are rendered adhesive, mixing the dampened cereal, adding a small amount of non-fat milk solids and mixing again, adding a small amount of melted shortening and mixing again, then forming the bar, and subjecting the formed bar to a pressure of not less than 500 p. s. i. nor more than 2000 p. s. i.

2. The invention defined in claim 1, wherein the cereal is selected from the group consisting of sugar-coated puffed rice, sugar-coated puffed wheat and sugar-coated corn flakes, and mixtures of these.

References Cited in the file of this patent

UNITED STATES PATENTS

| 2,170,155 | Musher | Aug. 22, 1939 |
| 2,278,466 | Musher | Apr. 7, 1942 |
| 2,437,150 | Berg | Mar. 2, 1948 |

FOREIGN PATENTS

| 22,177 | Great Britain | 1908 |

OTHER REFERENCES

"How to Make Candy," 1936, by W. W. Chenoweth, published by The MacMillan Co. (New York), pages 152-155.